RECORDING CIRCUIT FOR USE IN FACSIMILE RECEIVING EQUIPMENT

Filed May 27, 1963

INVENTOR.
TAKESHI NAKAGAWA

BY

OSTROLENK, FABER, GERB & SOFFEN
ATTORNEYS

United States Patent Office 3,325,818
Patented June 13, 1967

3,325,818

RECORDING CIRCUIT FOR USE IN FACSIMILE RECEIVING EQUIPMENT

Takeshi Nakagawa, Tokyo, Japan, assignor to Nippon Electric Company Limited, Tokyo, Japan, a corporation of Japan Filed May 27, 1963, Ser. No. 283,214
Claims priority, application Japan, May 30, 1962, 37/21,615
8 Claims. (Cl. 346—74)

This invention relates to facsimile recording means and more particularly to novel means for making a facsimile recording upon an electrolytic recording medium through the employment of a novel push-pull circuit arrangement.

Receiving circuits which are commonly used for receiving amplitude modulated facsimile signals are normally comprised of suitable amplification means for amplifying received facsimile signals to a magnitude sufficient to successfully operate the facsimile recording means. After suitable amplification the received signals must then be rectified in order to provide a D.C. current to control the operation of the recording instrument. Coupling means normally employed between the amplification means and the rectifying means consists of a power transformer. The characteristics of the power transformer are determined by the high power transmission level requirements and flat frequency requirements, thus necessitating the use of a bulky expensive output transformer device.

The instant invention discloses novel electronic recording circuitry which completely eliminates the need for such an output transformer and further provides a circuit having a compact design which further makes it economically advantageous over such prior art devices.

The device of the instant invention is comprised of a push-pull circuit having first and second input means for coupling a transformer secondary thereto. The transformer primary receives the amplitude modulated facsimile signals. The output branch of the push-pull circuit has the recording paper directly in series therewith such that when the amplitude modulated signals are of sufficient magnitude, one portion of the push-pull circuit is conductive so as to apply a D.C. current to the electrolytic paper means. When the polarity of the input signal is reversed and the signal magnitude again is at a sufficient level, the other portion of the push-pull circuit becomes conductive so as to apply D.C. current to the electrolytic paper means. In cases where the input signal is of insufficient magnitude to make either of the portions of the push-pull circuit conductive, no D.C. current is applied to the electrolytic paper means.

Another significant problem which exists in present-day facsimile recording systems is the non-uniform impedance characteristics of the electrolytic recording medium. Such non-uniform impedance characteristics are due to the non-uniform moisture content of such electrolytic paper and are also further due to the fluctuations in the input signal level. In order to overcome this, present-day devices employ spark-quenching circuits (or varistors of large capacity) which are connected in shunt with the recording paper to prevent the recording paper from damage caused by excess current density due to the non-uniform impedance of the electrolytic paper and due to fluctuations in the input signal level.

This problem can be overcome both completely and readily by the employment of a negative feed-back element in the push-pull circuit of the instant application. Thus, if the recording paper impedance decreases or increases for one reason or another, the output currents of the push-pull circuit portions tend to increase or decrease as a result thereof, thus changing the voltage across the negative feed-back element. The negative feed-back element is coupled to subsequently alter the bias voltage applied to the input terminals of the push-pull circuit which acts to either increase or decrease the output currents of the push-pull circuit portions in such a manner as to maintain the output currents of these portions at a substantially constant level. This results in the recording current being maintained at a substantially constant level, with no possibility of an excess current flowing in the recording paper. With an arrangement of this type, the spark-quenching circuit can be completely dispensed with, thus avoiding the necessity for an additional element which adds to the bulkiness and cost of the facsimile recording instrument. The negative feed-back element also operates as a safety element, preventing the occurrence of any damage to the push-pull circuit components which might be caused by a direct short circuit of the recording paper due to mis-operation thereof. Thus, even if a direct short-circuit occurs across the recording paper medium, the negative feedback element limits the current flow to the push-pull circuit components, thus preventing them from being either damaged or destroyed.

It is therefore one object of the instant invention to provide a novel facsimile recording means which completely eliminates the need for output transformer, rectifier and spark-quenching circuits necessary in the operation of prior art facsimile recording means.

Still another object of the instant invention is to provide a novel facsimile recording instrument employing a push-pull circuit arrangement.

Still another object of the instant invention is to provide a novel facsimile recording instrument employing a push-pull circuit having the electrolytic recording medium directly connected in series with said push-pull circuit.

A further object of the instant invention is to provide novel facsimile recording means, having a novel push-pull circuit with negative feed-back means to stabilize the operation of the recording means by obtaining uniform recording current density.

Another object of the instant invention is to provide novel facsimile recording means for receiving amplitude modulated facsimile signals by means of a push-pull circuit arrangement, which is directly connected with the electrolytic recording paper, without the necessity for employing an output transformer in the recording circuit.

Yet another object of the instant invention is to provide novel facsimile recording means having a push-pull circuit directly connected in series with the electrolytic recording medium, and having novel negative feed-back means for maintaining constant current density throughout the operation thereof in order to stabilize the operation of the recorder circuit, and further to protect the components of the push-pull circuit in the event of misoperation or short-circuiting of the electrolytic recording medium.

These and other objects of the instant invention will become apparent when reading the accompanying description and drawings in which.

Figure 1:
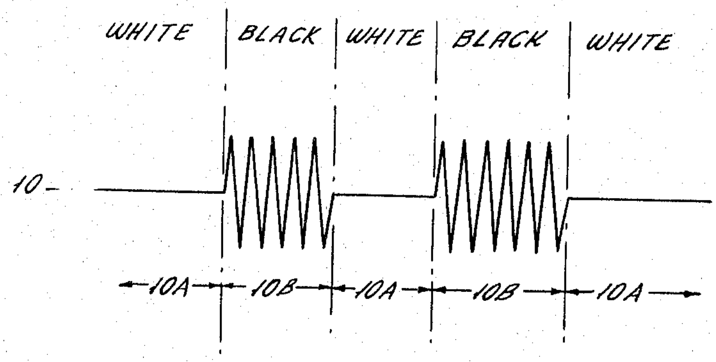
FIGURE 1 illustrates the waveform of a common amplitude modulated facsimile signal.

Referring now to the drawings, FIGURE 1 shows a typical amplitude modulated facsimile signal 10 which is transmitted to a receiver location which is employed to record the facsimile signals on an electrolytic recording medium. During the time intervals 10*a* it will be noted that no signal is transmitted, while during the time intervals 10*b* signals of a constant amplitude and a predetermined carrier frequency are generated. The facsimile signal is so employed that the time intervals 10*a* represent white spots in the facsimile to be recorded, while the interval 10*b* containing the carrier frequency signal of constant amplitude are employed to represent black spots in the facsimile.

Figure 2:
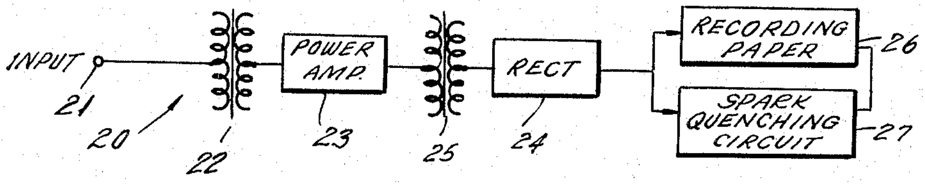
FIG. 2 PRIOR ART
FIGURE 2 illustrates a schematic block diagram of a conventional recording circuit employed in electrolytic recording type facsimile receiving systems.

A typical receiver system 20 is shown in FIGURE 2, which is employed for receiving facsimile signals of the type shown in FIGURE 1, and is comprised of a suitable input 21 which couples the signals 10 through first transformer means 22 to a power amplifier 23 which amplifies the input facsimile signals through a level sufficient for the successful operation of the recording means. The receiver system is coupled to a rectifier or demodulator means 24 by suitable output transformer means 25. The output of the rectifier means 24 is impressed upon the electrolytic recording medium 26 which may for example be any suitable electrolytic recording paper, in order to produce the facsimile represented by the facsimile signals being transmitted. A spark quenching circuit 27 is connected in direct parallel with the recording medium 26, in order to prevent any damage to the recording medium 26 which may be caused by excess current density impressed upon the recording medium 26 by the D.C. current output of the rectifier 24. Since a high power transmission level and a flat frequency characteristic are necessary for the successful operation of the recording means, this necessitates the use of a large and rather bulky power transformer 25.

Figure 3:
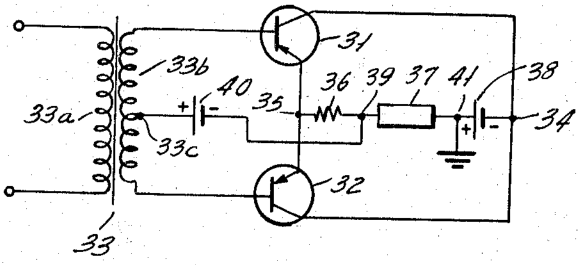
FIGURE 3 is a circuit diagram of a facsimile recording circuit designed in accordance with the principles of the instant invention.

FIGURE 3 shows a push-pull circuit 30 designed in accordance with the principles of the instant invention and which may be used in place of the recording circuit 20 of FIGURE 2. The recording circuit 30 of FIGURE 3 is comprised of first and second PNP alloyed junction-type transistors 31 and 32 respectively. While the embodiment of FIGURE 3 shows the use of PNP alloy junction-type transistors, any other suitable transistors may be employed. Also, NPN transistors may be employed if desired. In addition thereto, vacuum tubes or other suitable three-electrode or greater devices may be employed; such as vacuum tube triodes, pentodes, etc. The bases of transistors 31 and 32 are coupled to the end terminals of the secondary winding 33*b* of the transformer 33. The primary winding 33*a* is employed to receive the incoming facsimile signals, such as for example the signals 10 of FIGURE 1. The collector electrodes of transistors 31 and 32 are connected in common at 34, and the emitter electrodes are connected in common at 35. Between terminals 34 and 35 is a series circuit comprised of resistive element 36, the electrolytic recording medium 37 and a D.C. voltage source 38. The center-point 33*c* of secondary winding 33*b* is connected to a second D.C. voltage source 40, the opposite terminal of which is connected to the common point 39 between resistive element 36 and the electrolytic recording medium 37.

In the absence of a signal applied to the primary winding 33*a* of transformer 33, a bias is applied to the bases of transistors 31 and 32 due to the D.C. voltage supply 40, which biases in the backward direction across the base and emitter electrodes of both transistors 31 and 32, with the result that both transistors are placed in the cut-off condition. In this condition the potential across the terminals 39 and 41 to which the electrolytic recording medium 37 is connected is substantially 0 and hence no recording takes place.

When a positive half-cycle of the alternating current signal (such as for example the carrier frequency signal occuring during the time intervals 10*b*) is applied to the primary winding 33*a* of transformer 33, signals are superimposed on the fixed backward bias of voltage supply 40 and are applied in push-pull fashion across the base and emitter terminals of transistors 31 and 32 by the secondary winding 33*b*. So long as the magnitude of the alternating current signal is sufficiently large, one of the transistors 31 or 32, to which a negative half-cycle is applied, acts to overcome the backward bias of the voltage source 40 so as to become conductive. This causes a collector current to flow in the output circuit of the conducting transistor, such as for example the transistor 31; while the other transistor, namely transistor 32, to which a positive half-cycle is applied, remains in the cut-off condition. The collector current of the conducting transistor 31 flows through the collector circuit and the series elements 38, 37 and 36 back to the emitter electrode of the transistor 31, thus applying D.C. current to the electrolytic recording medium 37.

When the phase of the input facsimile signal is reversed, the other transistor, namely transistor 32, becomes conducting and the transistor 31 goes into cut-off condition. In this condition the collector current of transistor 32 flows through the series-connected elements 38, 37 and 36 back to the emitter electrode of transistor 32. In this manner every other half-cycle of the input signal causes the transistors 31 and 32 to conduct in alternative fashion, such that the collector currents of these transistors flow in an alternate fashion to the electrolytic recording medium 37, which is connected to the emitter side of the transistors. Thus, the composite current of full-wave rectification flows to the record medium 37 wherein the electrolytic recording operation takes place.

The negative feed-back is provided in the circuit by the resistive element 36, which is connected to the electrolytic recording medium 37. The resistive element 36 is not only an emitter resistance shared between the transistors 31 and 32, but is also a feed-back resistance for securing uniform recording current density and thus stabilize recording operation by applying a current feed-back to both the transistor switching circuits.

Let is be assumed that the recording paper impedance contained in the electrolytic recording medium 37 has for one reason or another either decreased or increased its impedance magnitude. Thus, the collector currents of both transistors tend to increase or decrease respectively at the same time, causing the voltage across the resistor 36 to increase or decrease respectively, with the result that the current feed-back bias voltage changes causing the base current of both transistors to become smaller or larger respectively, so as to impress a respective decrease or increase of the collector current, which thereby causes the collector current to be maintained at a constant magnitude with the result that the recording current (or density) is kept substantially unchanged. In this arrangement, there is no possibility of an excess current flowing in the recording paper 37, and the spark-quenching circuit 27 employed in the embodiment of FIGURE 2 can be completely dispensed with.

Proper selection of the resistance value of resistor 36 aids to prevent an excess current flowing in the recording circuit even when the electrolytic recording medium is completely destroyed during circuit operation and the recording terminals 39 and 41 act substantially as a short circuit thereacross. Thus, the resistive element 36, in the presence of such a short-circuit, limits the current flow through this series-connected path, with the result that both the D.C. recording power supply 38 and the transistor elements 31 and 32 are prevented from being damaged.

Thus, it can be seen that the instant invention provides a novel push-pull circuit for directly connecting input facsimile signals to an electrolytic recording medium, which circuit is capable of maintaining constant recording current density in the recording circuit and avoids the necessity for exepnsive and bulky elements formerly employed in prior art recording systems.

Although there have been described preferred embodiments of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A recording circuit for use in facsimile receiving equipment comprising first transfer means having an input winding for receiving facsimile signals and an output winding having first and second output terminals; switch means having first and second inputs connected to said first and second output terminals for being selectively turned on by said facsimile signals; said switch means having first and second outputs connected in common to one terminal of an output branch; an electrolytic recording medium and a power source connected in series with said output branch; said electrolytic recording medium being energized by said power source when said switch means is turned on.

2. The device of claim 1 wherein said means comprises a push-pull circuit having first and second control electrodes connected to the terminals of said output winding.

3. A recording circuit for use in facsimile receiving equipment comprising first means having first and second output terminals for receiving facsimile signals; second means having first and second inputs connected to said first and second output terminals for being selectively turned on by said facsimile signals; the first and second outputs of said second means having to a first common terminal of an output branch; an electrolytic recording medium connected in series with said output branch; said first means comprising a transformer having an input winding for receiving facsimile signals and having the terminals of its output winding connected respectively to said first and second inputs; said second means comprising a push-pull circuit having first and second control electrodes connected to the terminals of said output winding; said push-pull circuit including first and second transistors; the emitter terminals of said transistors being connected to a second common terminal of said output branch; the base electrodes being connected to the terminals of said output winding.

4. A recording circuit for use in facsimile receiving equipment comprising first means having first and second output terminals for receiving facsimile signals; second means having first and second inputs connected to said first and second output terminals for being selectively turned on by said facsimile signals; the first and second outputs of said second means having to a first common terminal of an output branch; an electrolytic recording medium connected in series with said output branch; said first means comprising a transformer having an input winding for receiving facsimile signals and having the terminals of its output winding connected respectively to said first and second inputs; said second means comprising a push-pull circuit having first and second control electrodes connected to the terminals of said output winding; said push-pull circuit including first and second transistors; the emitter terminals of said transistors being connected to a second common terminal of said output branch; the base electrodes being connected to the terminals of said output winding; the collector electrodes of said transistors being connected to said first terminal of said output branch.

5. A recording circuit for use in facsimile receiving equipment comprising first means having first and second output terminals for receiving facsimile signals; second means having first and second inputs connected to said first and second output terminals for being selectively turned on by said facsimile signals; said second means having to a first common terminal of an output branch; an electrolytic recording medium connected in series with said output branch; said first means comprising a transformer having an input winding for receiving facsimile signals and having the terminals of its output winding connected respectively to said first and second inputs; said second means comprising a push-pull circuit having first and second control electrodes connected to the terminals of said output winding; said push-pull circuit including first and second transistors; the emitter terminals of said transistors being connected to a second common terminal of said output branch; the base electrodes being connected to the terminals of said output winding; the collector electrodes of said transistors being connected to said first terminal of said output branch; said output branch being a series circuit connected between said first and second common terminals and being comprised of a D.C. voltage source in series with said electrolytic recording medium.

6. A recording circuit for use in facsimile receiving equipment comprising first means having first and second output terminals for receiving facsimile signals; second means having first and second inputs connected to said first and second output terminals for being selectively turned on by said facsimile signals; the first and second outputs of said second means having to a first common terminal of an output branch; an electrolytic recording medium connected in series with said output branch; said first means comprising a transformer having an input winding for receiving facsimile signals and having the terminals of its output winding connected respectively to said first and second inputs; said second means comprising a push-pull circuit having first and second control electrodes connected to the terminals of said output winding; said push-pull circuit including first and second transistors; the emitter terminals of said transistors being connected to a second common terminal of said output branch; the base electrodes being connected to the terminals of said output winding; the collector electrodes of said transistors being connected to said first common terminal; said output branch comprising a series circuit being connected between said first and second common terminals comprising a D.C. voltage source in series with said electrolytic recording medium; a negative feedback element connected in said series circuit; one terminal of said element being connected to said electrolytic recording medium and the other terminal being connected to said second common terminal.

7. A recording circuit for use in facsimile receiving equipment comprising first means having first and second output terminals for receiving facsimile signals; second means having first and second inputs connected to said first and second output terminals for being selectively turned on by said facsimile signals; the first and second outputs of said second means having to a first common terminal of an output branch; an electrolytic recording medium connected in series with said output branch; said first means comprising a transformer having an input winding for receiving facsimile signals and having the terminals of its output winding connected respectively to said first and second inputs; said second means comprising a push-pull circuit having first and second control electrodes connected to the terminals of said output winding; said push-pull circuit including first and second transistors; the emitter terminals of said transistors being connected to a second common terminal of said output branch; the base electrodes being connected to the terminals of said output winding; the collector electrodes of said transistors being connected to said first common terminal; said output branch comprising a series circuit being connected between said first and second common terminals comprising a D.C. voltage source in series with said electrolytic recording medium; a negative feedback element connected in said series circuit; one terminal of said element being connected to said electrolytic recording medium and the other terminal being connected to said second common terminal; a second D.C. voltage source having a first terminal connected to said output winding intermediate the end terminals thereof and having a second terminal connected to the said one terminal of said negative feedback element for biasing said transistors into cutoff in the absence of facsimile signals.

8. A recording circuit for use in facsimile receiving equipment comprising first means having first and second output terminals for receiving facsimile signals; second means having first and second inputs connected to said first and second output terminals for being selectively turned on by said facsimile signals; the first and second outputs of said second means having to a first common terminal of an output branch; an electrolytic recording medium connected in series with said output branch; said first means comprising a transformer having an input winding for receiving facsimile signals and having the terminals of its output winding connected respectively to said first and second inputs; said second means comprising a push-pull circuit having first and second control electrodes connected to the terminals of said output winding; said push-pull circuit including first and second transistors; the emiter terminals of said transistors being connected to a second common terminal of said output branch; the base electrodes being connected to the terminals of said output winding; the collector electrodes of said transistors being connected to said first common terminal; said output branch comprising a series circuit being connected between said first and second common terminals comprising a D.C.

voltage source in series with said electrolytic recording medium; a negative feedback element connected in said series circuit; one terminal of said element being connected to said electrolytic recording medium and the other terminal being connected to said second common terminal; a second D.C. voltage source having a first terminal connected to said output winding intermediate the end terminals thereof and having a second terminal connected to the said one terminal of said negative feedback element for biasing said transistors into cutoff in the absence of facsimile signals; said transistors each being P-N-P alloy junction transistors.

References Cited

UNITED STATES PATENTS

| | | | |
|---|---|---|---|
| 2,678,373 | 5/1954 | Suran | 346—74 |
| 3,125,759 | 3/1964 | Klein et al. | 346—74 |
| 3,184,750 | 5/1965 | Smith | 346—74 |

BERNARD KONICK, *Primary Examiner.*

J. BREIMAYER, *Assistant Examiner.*